Patented May 12, 1925.

1,537,928

UNITED STATES PATENT OFFICE.

ERWIN HOFFA AND HANS HEYNA, OF HOCHST-ON-THE-MAIN, GERMANY, ASSIGNORS TO FARBWERKE VORM. MEISTER LUCIUS & BRUNING, OF HOCHST-ON-THE-MAIN, GERMANY, A CORPORATION OF GERMANY.

VAT DYESTUFF CONTAINING SULPHUR AND PROCESS OF MAKING SAME.

No Drawing.   Application filed August 14, 1924. Serial No. 732,117.

*To all whom it may concern:*

Be it known that we, ERWIN HOFFA and HANS HEYNA, citizens of Germany, residing at Hochst-on-the-Main, Germany, have invented certain new and useful Improvements in Vat Dyestuffs Containing Sulphur and Processes of Making Same, of which the following is a specification.

In U. S. patent-application Ser. No. 691,481 filed February 8, 1924, Example 8, it is stated that the product obtained by condensing Bz-1-chloro-6.7-benzo-oxythionaphthene

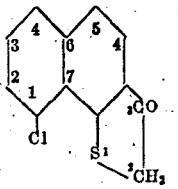

with 2.3-Diketodihydrothionaphthene-p-dimethyl-2-anile yields a dyestuff which is distinguished by its great affinity for the fibre and its tinctorial powers. Now we have made the observation that also the condensation products obtained by means of alpha-substitution products of isatins possess the same properties.

The following examples illustrate our invention:

(1) To a solution of alpha-isatinchloride, prepared from 30 parts of isatin, 42 parts of phosphorous pentachloride and 100 parts of benzene, are added 46 parts of Bz-1-chloro-6.7-benzo-oxythionaphthene in 100 parts of benzene. After having heated the solution for a short time, it becomes violet and the dyestuff separates in the form of crystals. It dyes in the vat cotton a dark bluish-grey tint.

(2) To a solution of 5-bromo-alpha-isatinchloride, prepared from 23 parts of 5-bromisatin, 22 parts of phosphorous pentachloride and 100 parts of benzene, are added 24 parts of Bz-1-chloro-6.7-benzo-oxythionaphthene suspended in 24 parts of benzene. After having heated the mixture for a short time, the dyestuff separates. It dyes in the vat cotton a blue tint with a red hue.

(3) To a solution of dibromo-alpha-isatinchloride, the position of the bromine atoms being probably in the 5.7 position, prepared from 60 parts of dibromisatin, 42 parts of phosphorous pentachloride in 500 parts of benzene, are added 46 parts of Bz-1-chloro-6.7-benzo-oxythionaphthene suspended in 40 parts of benzene. After having heated the mixture for a short time, the dyestuff separates. It dyes cotton a grey tint with a violet hue.

(4) To a solution of beta-naphthisatinchloride, prepared from 20 parts of beta-naphthisatin and 22 parts of phosphorous pentachloride in 100 parts of benzene, are added 24 parts of Bz-1-chloro-6.7-benzo-oxythionaphthene suspended in 24 parts of benzene. The dyestuff, which separates after the mixture has been heated for a short time, dyes cotton a dull green tint.

Having now described our invention, what we claim is:

1. The process of preparing vat-dyestuffs containing sulphur, which consists in condensing Bz-1-halogen-6.7-benzo-oxythionaphthenes with reactive alpha-substitution products of isatins.

2. As new substances, the dyestuffs of the general formula:

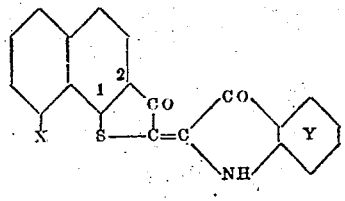

wherein X signifies halogen, Y a benzene or naphthalene nucleus, and wherein the isatin and the benzooxythionaphthene residues may be substituted in any manner, which dyestuffs are, in a dry state, brownish-violet powders and dissolve in concentrated sulphuric acid with a characteristic coloration.

3. A new product, the dyestuff of the following formula:
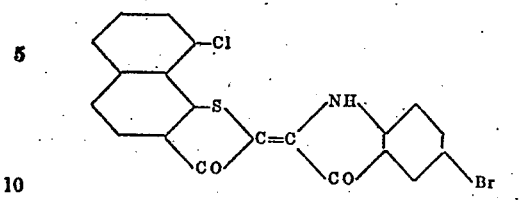
being a brownish-violet powder, soluble in concentrated sulphuric acid with a blue color, dyeing cotton from a golden-yellow vat a blue tint of good fastness to washing and chlorine.
In testimony whereof we affix our signatures.
ERWIN HOFFA.
HANS HEYNA.
Attest:
C. C. L. B. WYLES,
EDITH BETCHER.